Figure 1:
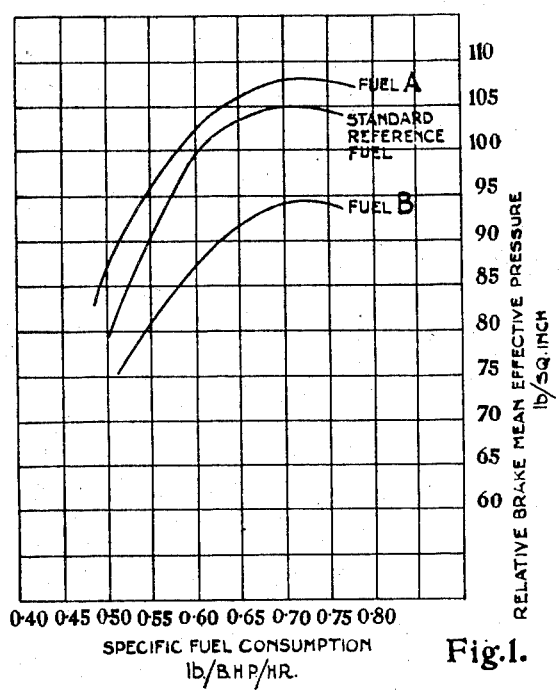

Nov. 20, 1951   D. A. HOWES ET AL   2,576,071
AVIATION OR MOTOR FUELS
Filed Jan. 29, 1948   3 Sheets-Sheet 2

INVENTORS
DONALD ALBERT HOWES, THOMAS TAIT,
PATRICK DOCKSEY, STANLEY FRANCIS BIRCH, AND
WILLIAM ARTHUR PARTRIDGE
By Morgan, Finnegan, and Durham
Attorneys Nov. 20, 1951    D. A. HOWES ET AL    2,576,071
AVIATION OR MOTOR FUELS
Filed Jan. 29, 1948    3 Sheets-Sheet 3

INVENTORS
DONALD ALBERT HOWES, THOMAS TAIT,
PATRICK DOCKSEY, STANLEY FRANCIS BIRCH, AND
WILLIAM ARTHUR PARTRIDGE

By Morgan, Finnegan and Durham
Attorneys

Patented Nov. 20, 1951

2,576,071

UNITED STATES PATENT OFFICE 2,576,071

AVIATION OR MOTOR FUELS

Donald Albert Howes, Thomas Tait, Patrick Docksey, Stanley Francis Birch, and William Arthur Partridge, Sunbury-on-Thames, England, assignors to Anglo-Iranian Oil Company Limited, London, England, a British joint-stock corporation Application January 29, 1948, Serial No. 4,974
In Great Britain February 24, 1941

6 Claims. (Cl. 44—69)

This invention relates to the production of high grade aviation or motor fuels, and the invention includes the products of the process.

It is customary in present day refining practice to produce high grade aviation fuels of 90 to 110 octane number (C. F. R. Motor Method) by blending selected straight run distillates to the required boiling range with synthetic isoparaffin materials such as alkylates produced by the interaction of, for example butenes with isobutane, or pentenes or propene with isobutane, hydrogenated polymers of olefines such as isobutene, normal butenes or propene, or hydrogenated co-polymers of isobutene and normal butenes. Tetraethyl lead is then added to the blend in proportions prescribed by aviation fuel specifications, which are usually 3–6 ccs. per imperial gallon.

The octane number of such fuels normally determined according to a method such as the C. F. R. Motor Method is not actually a true indication of anti-knock or power output characteristics of a fuel, particularly at rich fuel air mixture strengths. This is made clear in the following Table 1, in which octane numbers determined by the C. F. R. Motor Method with respect to six samples of fuel of known composition and characteristics are set beside equivalent numbers that represent actual peak performance tests made in a standard engine unit under identical test conditions, the engine being coupled to a water brake and cooled by an air stream from an electrically driven fan and operated under the following conditions:

Compression ratio, 8:1
Speed, 2400 R. P. M.
Cylinder head temperature, 185° C.
Inlet air temperature, 110° C.
Ignition advance, 29°

Table 1

| Fuel Sample No. | C. F. R. Motor Octane No. | Relative Peak Power output at rich mixture strength in an air cooled aero-engine in percentage as compared with a standard fuel [1] |
|---|---|---|
| | | Per cent |
| 1 | 95.0 | 97.5 |
| 2 | 100.1 | 98.5 |
| 3 | 99.0 | 86 |
| 4 | 99.6 | 93 |
| 5 | 99.0 | 97 |
| 6 | 102.8 | 91.5 |

[1] The standard fuel was isooctane to which had been added 1.25 cc. T. E. L. per U. S. gallon.

The tests are carried out in the following manner:

The engine which is first warmed up and then adjusted to the standard conditions of the test and the fuel to be tested is thereupon passed into a tank in the determined quantity for the test, such as 10–20 gallons.

The inlet manifold pressure which is controlled by a compressor or supercharger is adjusted to a low value (generally atmospheric or just over), and the carburettor adjusted so that the air-fuel ratio is slowly increased until slight detonation is heard, while adjusting the brake loading to keep the speed constant, and adjusting the inlet air heating and wind speed in order to maintain the temperatures at the required values. The engine is then run under these conditions for a few minutes while the operator satisfies himself that it is on the point of slight detonation, that is when detonation is just audible.

The fuel supply is then changed to a graduated burette and the fuel consumption measured by an observer by timing with a stop watch, the consumption of ½ or 1 pint of fuel. At the same time another observer notes the brake loading in pounds and from this reading calculates the power output of the engine in terms of brake horse power (B. H. P.) and also brake mean effective pressure (B. M. E. P.) lb./sq. in. Knowing the specific gravity of the fuel, the specific consumption is then calculated as lb./B. H. P./hr. This value is then plotted against B. M. E. P. at slight knocking. The process is then repeated at increasing inlet manifold pressures up to and just beyond the maximum power output of the engine on the particular fuel, thus obtaining a curve of performance (B. M. E. P.) against specific consumption at slight audible knock.

A similar curve is also obtained at the same time for a standard reference fuel against which the aviation fuel under test may be compared. In most cases the standard reference fuel is one known from general experience to be fully satisfactory under all flying conditions and used as a minimum acceptance standard of performance. Thus in Figure 1 of the accompanying drawing Fuel A would be considered a satisfactory fuel, whereas Fuel B would be considered unsatisfactory. A convenient numerical index for the engine performance of the fuel in terms of the standard reference fuel is obtained by expressing the maximum B. M. E. P. given at the peak of the curve (Figure 1) by the fuel under test, as a percentage of that given by the standard reference fuel at the peak of the curve. Thus, if the standard reference fuel as in Figure 1, gives a peak B. M. E. P. of 210 lb./sq. in., and Fuel A gives a peak B. M. E. P. of 217 lb./sq. in., it may be regarded as having a relative rating, as compared with the reference fuel, of 103%. Similarly Fuel B which has a peak B. M. E. P. of 189 lb./sq. in., may be regarded as having a relative rating of 90%.

It is found in practice that when straight run distillates produced from naphthenic crude oils are used in aviation fuels as blends with synthetic isoparaffinic materials such as those hereinbefore referred to, the blends are satisfactory as to power output characteristics when they contain 50–60% by volume of the synthetic isoparaffin component. On the other hand, when straight run distillates from paraffinic crude oils are used, aviation fuels of 100 octane number that are satisfactory with respect to power output characteristics, can only be prepared by using a greater quantity of the synthetic isoparaffin component the cost of whose production is greatly in excess of the cost of producing straight run distillates. Proportions of from 70% to 90% of the synthetic isoparaffin component are normal when such distillates are used for blending. Thus the proportion of the isoparaffinic component required is dependent on the aero-engine anti-knock value of the straight run component. The lower that value the greater the proportion of the synthetic isoparaffin component required.

Furthermore straight run aviation spirits to which the prescribed proportion of tetra-ethyl lead fluids is added, when used alone are not suitable as aviation fuels of 100 octane number, inasmuch as they are not sufficiently resistant to detonation in aero-engines. Addition of the more expensive synthetic isoparaffin material is necessary, and the power output of the aviation fuel is determined by the proportion of the isoparaffinic material used.

The invention has among its objects to produce high grade aviation or motor fuels from straight run distillates of mineral oils, under conditions of economy, by avoiding or minimising the use as blending components of the more expensive synthetic isoparaffin materials, and mainly or entirely to use straight run distillates or fractions thereof.

In carrying the invention into effect in the use of a paraffin base crude Iranian mineral oil, the crude oil is distilled for the production of a fraction or fractions boiling within the aviation gasoline range, said fraction or fractions being superfractionated under the conditions hereinafter described. This may be carried out according to the following flow diagram, for the recovery of high grade fractions of isopentane, the "isohexane" fraction of high octane number comprising cyclopentane together with the dimethylbutanes and the methyl pentanes boiling approximately in the boiling range 45° C. to 64° C., and an "isoheptane" fraction of high octane number comprising the cyclic hydrocarbons and branched chain hydrocarbons boiling approximately in the range 72° C. to 92° C. to the substantial exclusion from the fractions recovered of n-pentane, n-hexane and n-heptane and heavier hydrocarbons when containing substantial proportions of aromatic hydrocarbons.

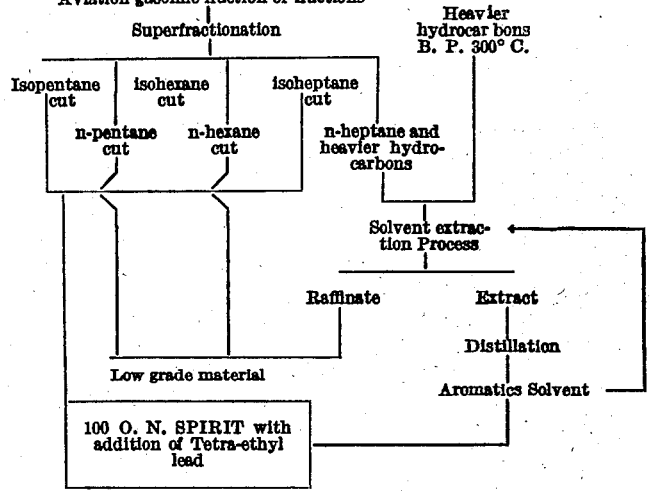

The n-heptane fraction together with heavier hydrocarbons may be subject to solvent extraction and the raffinate produced may be added to the n-pentane and n-hexane fractions, while the extract may be distilled and the aromatic hydrocarbons boiling in the motor spirit range separated by fractionation.

The aromatic hydrocarbons separated may be further treated for their concentration before use and may be used for addition to fractions recovered under conditions of superfractionation. It is however preferred to add to the mixture of the isopentane and "isohexane" and "isoheptane" fractions respectively containing the hydrocarbons of high octane number hereinbefore set forth, a proportion of toluene or other aromatic hydrocarbon or hydrocarbons boiling in the motor spirit range.

The removal from the gasoline distillate of the normal paraffins, pentane, hexane and heptane or any of them or fractions rich in such normal paraffins may be by effective superfractionation under the conditions hereinafter described, without substantial loss of high grade material, whereby a substantial improvement is effected which in general increases the octane rating of the blended fuel produced in the use of the high-grade fractions recovered from the distillate to allow 100 octane number aviation fuels to be obtained by the mere addition to the distillate of up to 3 to 6 ml. tetra-ethyl lead fluid per imperial gallon.

In the subjoined table are detailed the hydrocarbons occurring in an Iranian crude oil light fraction when separated by fractionation in a column having a fractionation efficiency equivalent to that of 75 theoretical plates whereby yields result from initial boiling point to 92° C. that are set out in the table.

Table 2

|  | B. P., ° C. | O. N. (C. F. R.) |
|---|---|---|
| C₅H₁₂ (Pentane Isomers) | | |
| Isopentane (a) | 27.8 | 89 |
| N-pentane | 36.08 | 61 |
| "Isohexane" Fraction (b) | | |
| Cyclopentane | 49.5 | 83 |
| 2.2-Dimethylbutane | 49.7 | 96 |
| 2.3-Dimethylbutane | 58.1 | 95 |
| 2-Methylpentane | 60.3 | 73 |
| 3-Methylpentane | 63.2 | 75 |
| N-Hexane | 68.8 | 25 |
| "Isoheptane" Fraction (c) | | |
| Methylcyclopentane | 72.0 | 82 |
| Benzene | 80.1 | 108 |
| 2.2-Dimethylpentane | 79.3 | 93 |
| 2.4-Dimethylpentane | 80.6 | 82 |
| Cyclohexane | 80.8 | 77 |
| 2,2,3-Trimethylbutane | 81.0 | (¹) |
| 1-Methyl-2-isopropyl-cyclopropane | 81.0 | -- |
| 3.3-Dimethylpentane | 86.0 | 84 |
| 1.1-Dimethylcyclopentane | 87.5 | ca. 80 |
| 2.3-Dimethylpentane | 89.8 | 89 |
| 2-Methylhexane | 90.1 | 45 |
| 1.3-Dimethylcyclopentane | 90.7 | ca. 80 |
| trans 1.2-Dimethylcyclopentane | 91.8 | ca. 80 |
| 3-Methylhexane | 91.8 | ca. 45 |
| 3-Ethylpentane | 93.3 | -- |
| N-Heptane | 98.4 | -- |

¹ Isooctane, 1 cc. T. E. L.

Blending together the isopentane (a) and the "Isohexane" and "Isoheptane" fractions respectively (b) and (c) the materials produced have a C. F. R. motor octane number of 78. The addition of 4 ml. tetra-ethyl lead fluid per imperial gallon raises the octane number to 96.

The recovery of high grade fractions and the recovery and segregation of the low grade fractions by superfractionation is carried out as hereinafter described.

Separation of isopentane and n-pentane fractions in a substantial state of purity is readily obtained, other materials being present in only very small amounts, for example 1–3% by volume.

In the case of the so-called "Isohexane" fraction it is found possible when dealing with Iranian crude oil to recover a fraction having for example a boiling range of from 45° C. or lower to about 64° C., but precision in fractionation is necessary to ensure that the fraction contains little n-pentane (B. P. 36° C. O. N. (C. F. R. M.) 61) and also little n-hexane (B. P. 68.8° C. O. N. (C. F. R. M.) 25).

In the case of the so-called "Isoheptane" fraction, it is found possible to recover a fraction having a boiling range of 72° C. to about 92° C., and in this case also precision in fractionation is necessary to ensure that while the fraction contains as much methylcyclopentane (B. P. 72° C. O. N. (C. F. R. M.) 82), as possible, and as little n-hexane as possible at the lower end of its boiling range, and as much dimethyl cyclopentanes and as little 3-methyl hexane (B. P. 91.8° C. O. N. (C. F. R. M.) ca. 45) and 3-ethyl pentane (B. P. 93.3° C. O. N. (C. F. R. M.) ca. 45) as possible at the higher end of its boiling range. It is however not possible even under the conditions of superfractionation described to effect complete segregation of low and high octane number fractions. For example, owing to the peculiar vapour-liquid relationship of mixtures of n-hexane and benzene it is frequently found that the n-hexane fraction (n-Hexane O. N. 25) contains a small amount of benzene (Benzene O. N. 100), such for example as 1–5%. Moreover the boiling points of some hydrocarbons of widely different octane numbers are so close that complete separation is impossible. For example, trans 1.2-dimethyl cyclopentane (O. N. ca. 80) has substantially the same boiling point (91.8° C.) as 3-methyl hexane having an octane number of ca. 45. The extent of separation possible calls for the maximum economic number of fractionation plates in each case and a high reflux ratio, whereby substantial precision in fractionation is ensured, while contamination of the fractions with hydrocarbons of closely related boiling points and low octane number is so minimised that neither the octane number of the fuel produced, nor its freedom from detonation under normal or peak power output conditions are substantially affected.

The boiling ranges of the high octane number fractions separated may vary according to the composition of the crude oils employed and be so adjusted as to include the valuable materials of high octane number, and to avoid those of low octane number, under the conditions of substantial precision of fractionation indicated.

The aromatic hydrocarbons present in the crude oil may also be concentrated by effective fractionation and used in such restricted proportion as is permitted by aviation fuel specifications. In general however, owing to the formation of constant boiling point mixtures, benzene is distilled at a temperature lower than its normal boiling point and in the Near Eastern crude oil referred to boils over the range 69 to 77° C. Thus a certain amount of benzene is segregated in the n-hexane fraction, and the bulk of it recovered in the "iso-heptane" fraction.

Figure 2:
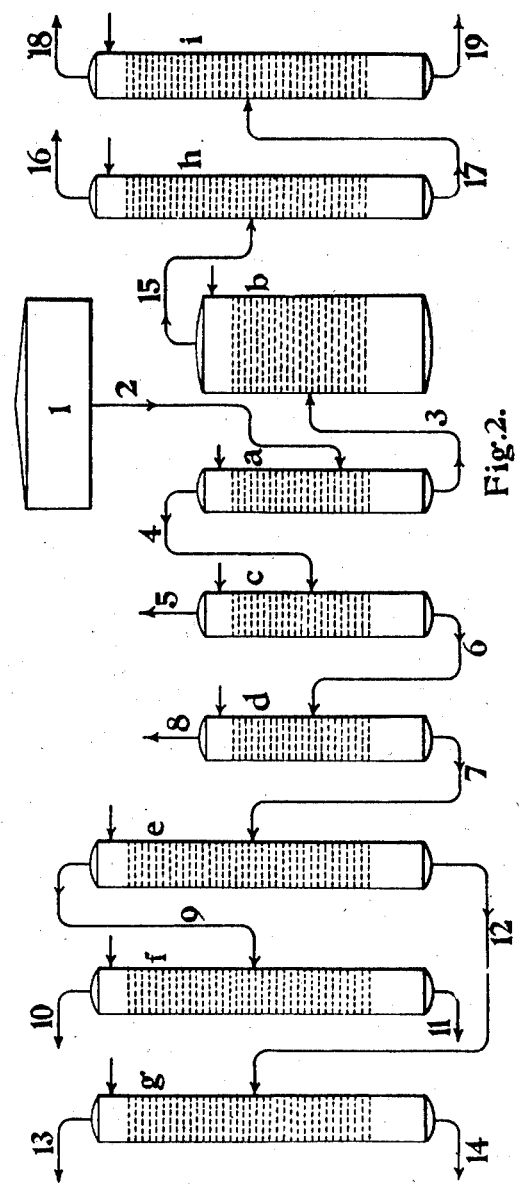
Figure 3:
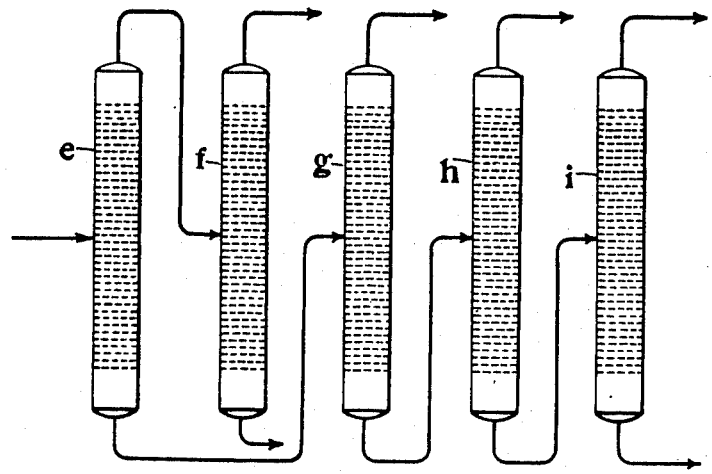
Figure 4:
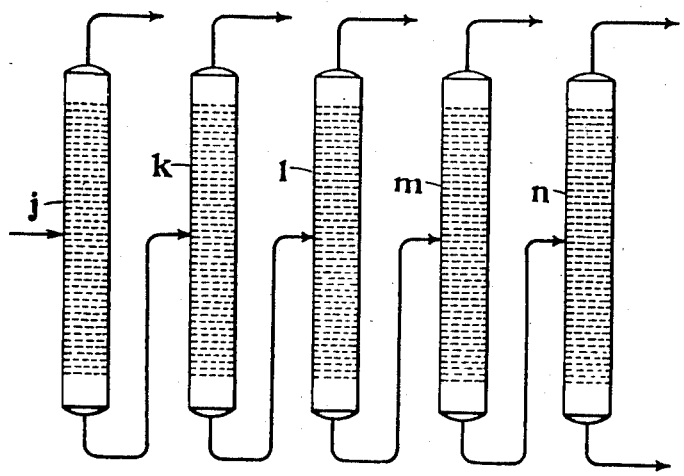

The process of the invention is illustrated by way of example in Figure 2 of the accompanying diagrammatic drawing which illustrates a fractionating plant in which fractionation according to the invention may be carried out after first preparing two basic fractions for submission to fractionation for the separation of the normal paraffin hydrocarbons and isopentane and for the separation of the "isohexane" and "isoheptane" fractions, these latter fractions comprising hydrocarbons respectively having 6 and 7 carbon atoms in the molecule and of nearly related boiling points and high octane numbers. Figures 3 and 4 illustrate other modifications.

In carrying the invention into effect as illustrated in Figure 2, the crude oil is first treated for preparation from it of two basic fractions. For this purpose the crude oil is fed by pump from a storage tank 1 (Figure 2) by way of a pipe line 2 to a continuous flash distillation unit a, b comprising a primary flash column a having the equivalent of 20 theoretical plates operating at a reflux ratio of 2:1, a pressure of 40 lbs./sq. in., an overhead temperature of for example about 95° C. and a bottom temperature of about 235° C. The secondary column b of the unit a, b is provided with the equivalent of 24 theoretical plates, and operates at a reflux ratio of 4:1, at atmospheric pressure and at an overhead temperature for example of about 98° C. and a bottom temperature for example of about 263° C. In operation the crude oil enters the primary flash column a and a light fraction boiling for example up to 69° C. together with the lighter gaseous components are taken overhead. The overhead fraction under these conditions consists of hydrocarbons having 1 to 6 carbon atoms in the molecule. This fraction is hereinafter referred to as the primary flash distillate.

The residue leaving the column $a$ passes to the secondary column $b$ of the unit $a$, $b$ by way of the pipe line 3, whereby an overhead product boiling for example substantially below 120° C. may be obtained.

The overhead product from the column $b$ thus consists of hydrocarbons having 6 carbon atoms in the molecule, that were not taken overhead in the column $a$, together with hydrocarbons of higher boiling point up to and including normal hydrocarbons having 7 carbon atoms in the molecule. This fraction is hereinafter referred to as the "isoheptane base" fraction.

The primary flash distillate from fractionating column $a$ is passed by the pipe line 4 to a stabiliser column $c$ having the equivalent of 30 theoretical plates. A reflux ratio of 4:1 may be maintained in the fractionating column $c$, a pressure of 300 lbs./sq. in., an overhead temperature for example of 46° C. and a bottom temperature for example of 121° C. In the column $c$ the distillate may then be stabilised by the removal as overhead through the pipe line 5 of hydrocarbons having less than 4 carbon atoms in the molecule. The bottoms product leaving the column $c$ passes through the pipe line 6 to the fractionating column $d$ where it is debutanised, care being taken to ensure that not more than a small amount of butane is left in the bottoms product which consists of hydrocarbons having 5 and 6 carbon atoms in the molecule. To accomplish this operation the column $d$ may have the equivalent of 30 theoretical plates, and may operate at a 5:1 reflux ratio and at about 100 lbs./sq. in. pressure, with an overhead temperature for example of 43.3° C. and a bottom temperature of 121° C., whereby a bottoms product substantially free of butanes is ensured without loss of isopentane. The effluent, consisting of normal butane and isobutane from the fractionating column $d$ is taken overhead through pipe line 8 to storage.

The debutanised product leaving the base of the column $d$ through the pipe line 7 passes to the superfractionating column $e$, which may have the equivalent of 50 theoretical plates, in which a reflux ratio of 10:1, a pressure of 10 lbs./sq. in., an overhead temperature of 54.5° C., and a normal bottom temperature of for example 103.75° C. may be maintained.

The operating conditions in the column $e$ are so determined that the residue leaving the bottom of the column contains a normal pentane concentration such that the "isohexane" overhead fraction from column $g$ contains not more than 3%. It is necessary however to ensure that substantially all the cyclopentane and dimethylbutane available remains in the bottoms product from column $e$, which is accomplished by permitting a small amount of normal pentane also to be present.

The cyclopentane-dimethylbutane content of the overhead from the superfractionating column $e$ is thus determined by distillation of a 100 ml. sample to 10% residue in a 25 plate laboratory fractionating column at 30:1 reflux ratio. This 10% residue is re-distilled to dryness in a flask on a water bath, and the refractive index of the distillate determined, from which the cyclopentane-dimethylbutane content of the original sample of overhead is easily estimated.

The fractionation operation carried out in the superfractionating column $e$ results in the production of two fractions, namely the pentane fraction overhead, and the "hexane" fraction as a bottoms product. These fractions are passed to the superfractionating columns $f$ and $g$ respectively for the separation as overhead products of isopentane from column $f$ and isomeric branched hexanes and cyclopentane from column $g$.

The overhead from the superfractionating column $e$ is passed through a pipe line 9 as feed to the superfractionating column $f$, which is provided with the equivalent of 50 theoretical plates, and may operate at a pressure of 10 lbs./sq. in. at a reflux ratio of 15:1, an overhead temperature of 42.2° C. and a bottom temperature of 51.6° C., whereby the feed may be separated into an isopentane fraction overhead containing not more than 3% normal pentane, taken through the pipe line 10 to storage and a normal pentane bottoms that is withdrawn through the pipe line 11.

The bottoms product from the superfractionating column $e$ is passed by pipe line 12 as feed to the superfractionating column $g$ which has the equivalent of 50 theoretical plates and operates at atmospheric pressure and with a reflux ratio of 15:1, at an overhead temperature of 65.5° C. and at a bottom temperature of 87.7° C., yielding an "isohexane" fraction overhead taken to storage through the pipe line 13 and normal hexane bottoms which passes through the pipe line 14. Separation between these two fractions may thus be so determined as to yield an overhead "Isohexane" fraction of octane number between 77 and 81 (C. F. R. Motor Method). A high yield may be obtained when operating for the production of a lower octane number product, and the separation made whereby there is no normal hexane in the overhead, but the bottoms contain a certain amount of 3-methylpentane. This type of "isohexane" fraction contains no normal hexane and is composed of:

| | Octane No. |
|---|---|
| 3% n-pentane (governed by column $e$). | |
| All cyclopentane | 83 |
| All 2.2-dimethylbutane | 96 |
| All 2.3-dimethylbutane | 95 |
| All 2-methylpentane | 73 |
| And approximately all 3-methylpentane | 75 |

In the "isohexane" fraction an upper limit of 2% of normal pentane and 1% of normal hexane should be regarded as the maximum limit of impurity, representing a drop of one octane number (calculated).

"Isohexane" fractions of higher octane number but obtainable with lower yields may be produced by leaving larger quantities of the 3- and 2-methylpentanes in the bottoms. The control of the operation to obtain a product of this type may be made so that the hexane fraction fed to the column is split in an overhead/bottoms ratio known by trial to give the desired octane number and yield.

Analytical control of the separation for maximum yield of material of the lowest octane number may be made by distilling the "isohexane" fraction overhead in a 25 plate laboratory column at 40:1 reflux ratio to a 10% residue, and re-distilling this residue in a 25 plate laboratory column at 40:1 reflux ratio, from which the presence of any normal hexane can be detected. The bottoms may be analysed for 3-methylpentane by taking a 10% distillate in a 25 plate laboratory column at 20:1 reflux ratio and re-distilling this distillate at 40:1 reflux ratio in a 25 plate laboratory column.

Analytical control of the separation for yields of products of higher octane number may be made by checking the cut points of the products obtained from the two boiling point curves determined in a 25 plate laboratory column, for example if the foregoing test shows the presence of a substantial proportion of normal hexane, suitable control adjustments may be made.

The "Isoheptane" base fraction recovered as overhead from the secondary column $b$ of the crude oil distillation unit may be passed through the pipe line 15 to a superfractionation column $h$ having the equivalent of 50 theoretical plates, operating at atmospheric pressure at a reflux ratio of 15:1, an overhead temperature of 60.5° C. and bottom temperature of 93.8° C. The overhead taken at this column consists of normal hexane taken off through the pipe line 16 and the conditions may be so determined that the maximum quantity of methylcyclopentane and the minimum quantity of normal hexane remain in the bottoms.

Analysis of the bottoms for normal hexane and methylcyclopentane may be made by the distillation of a sample to 85° C. in a 25 plate laboratory column at a reflux ratio of 20:1. The distillate to 85° C. may be re-distilled to 75° C. in a 25 plate laboratory column at 30:1 reflux ratio. This fraction may be composed of a mixture of benzene, methylcyclopentane and normal hexane, and may be analysed for these constituents by absorption of the benzene in sulphuric acid and determination of the ratio of naphthene to paraffin in the aromatic free spirit by the linear relationship between the specific refractions of the two components.

The bottoms product resulting from the operation carried out in the superfractionation column $h$ are passed through a pipe line 17 to a superfractionating column $i$ in which a separation is made between the "isoheptane" fraction and the "normal heptane" fraction that are withdrawn through the pipe lines 18 and 19 respectively. This separation may be accomplished by providing in the column the equivalent of 50 theoretical plates and operating under atmospheric pressure at a reflux ratio of 10:1, overhead temperature of 83.8° C. and bottom temperature of 101.25° C. The operation may be carried out so that no more than 0.5% of normal heptane remains in the overhead. The n-heptane fraction together with heavier hydrocarbons when containing substantial proportions of aromatic hydrocarbons may be subjected to solvent extraction instead of being withdrawn from the system through the pipe line 19. In such case the fraction in whole or in part may be conducted through valved pipe line 21 to a combined solvent extraction and refining unit 22 from which the raffinate produced may be withdrawn through the pipe line 23 and the aromatic hydrocarbons boiling in the motor spirit range withdrawn through the pipe line 24 following their distillation from the extract in the extraction unit 22.

The combined operations carried out in the superfractionating column $h$ and $i$ may be controlled so that the resulting "isoheptane" fraction has the following properties:

(a) Distilling to 75° C. not less than 17.5% weight.
(b) Distilling to 85° C. not less than 44.0% weight.
(c) Normal hexane content of fraction to 75° C. not more than 20% weight.
(d) Fraction above 95° C. not more than 0.5% weight.
(e) Fraction distilling to 85° C. should contain not less than 40% to 75° C. so that not more than 60% distills between 75° C. and 85° C.

Under the conditions of the example described there are produced the following high grade fractions suitable for blending together or with other high grade materials for the production of an aviation or motor fuel of high octane number, that is to say:

(i) Isopentane as overhead from the superfractionating column $f$, to the substantial exclusion of normal pentane.

(ii) An "isohexene" fraction as overhead from the superfractionating column $g$ having an approximate boiling range of 45° C.–64° C. including cyclopentane and the four hexane isomers, to the substantial exclusion of normal hexane.

(iii) An "isoheptane" fraction as overhead from the superfractionating column $i$, having an approximate boiling range of 72° C.–92° C.

Such separated fractions of high C. F. R. motor octane number may be blended together in determined proportions to yield aviation fuels having satisfactory power output characteristics and of high rating as determined by performance in a standard engine unit in the manner hereinbefore described. Tetra-ethyl lead fluid is added in amounts prescribed by specification, for example 3–6 ml. per imperial gallon.

It will be understood that the ratio of the constituents of a blend may vary widely and may comprise a number of fractions boiling in the gasoline range that have been recovered from straight run distillates in the manner hereinbefore described, in addition to which there may be a proportion of an aromatic hydrocarbon or hydrocarbons such as benzene, toluene or xylene added as may be necessary to meet specification requirements.

With regard to proportions, that of isopentane is limited by reason of its high vapour pressure, but it may be present in such proportion not exceeding 20% by volume of the finished blend as is necessary to ensure the required volatility of a blend. The proportion of the isohexane fraction may vary up to the limit of vapour to liquid ratio under which vapour lock is avoided; in the case of a straight blend of the three fractions, the proportion of isohexane fraction should not exceed 25% by volume but where other hydrocarbon blending materials are used, the proportion of isohexane fraction may amount to as much as 35% by volume. Also, where other hydrocarbon blending materials are used, the proportion of the isoheptane fraction should not exceed 55% by volume, while when both synthetic isoparaffins and aromatic hydrocarbons are used as blending materials, the proportion of the isoheptane fraction should not exceed 40% by volume.

In the preparation of any aviation fuel blend from fractions produced in the manner hereinbefore described there may be included other high grade materials boiling in the gasoline range.

The proportions may be determined as follows:

$$Aa + Bb + Cc + Dd \ldots = 100.x$$

where A, B, C, D, . . . are volume percentages of the intended constituents, $a$, $b$, $c$, $d$, . . . the engine performance numbers of the respective constituents, and $x$ the engine performance number of the blend determined by test in the standard engine unit as hereinbefore described. The engine performance number of a fuel relates to its peak performance in the use of the fuel in a standard engine unit, in relation to the performance in the same standard engine unit of a standard octane number reference fuel to which the number 100 is assigned.

Thus assuming the following materials A, B, C, D, are intended to be blended in the respective proportions and have the following respective engine performance numbers:

Component A 25% Engine performance No. 80
Component B, 10% Engine performance No. 95
Component C 20% Engine performance No. 100
Component D 45% Engine performance No. 75 then within the normal limits of experimental error, the corresponding number of the blend is given by the equation:

$$\frac{(25 \times 80) + (10 \times 95) + (20 \times 100) + (45 \times 75)}{100}$$

$$= 83.25 \text{---say } 83$$

In blending the constituents of aviation fuels to meet the requirements of a specification, it is possible on knowing the engine performance numbers of the blends to determine by simple inspection which of the blends meets the specification. Small quantities of such blends may then be prepared and examined in the laboratory for confirmation, and any slight adjustment of blend composition may then be made experimentally, and the blend composition finally determined. In applying this usual method of blending aviation and motor fuels it is necessary also to bear in mind economic considerations by using as little as may be sufficient of expensive materials and as much as may be satisfactory of inexpensive materials, utilising such materials as are actually available and leaving a minimum unutilised surplus. Thus the fractions obtained by superfractionation under the conditions of the process of the invention may be adjusted both in quantity and quality to meet specification requirements.

The following are examples of suitable blends:

Example 1

| | Percent by volume |
|---|---|
| Isopentane | 20 |
| "Isohexane" fraction | 10 |
| "Isoheptane" fraction | 50 |
| Toluene | 20 |

This blend, after the addition of 4 ml. tetra-ethyl lead fluid per imperial gallon, satisfies the requirements of current 100 octane number aviation fuel specification, and has satisfactory power output characteristics in both air cooled and water cooled aero-engines at all air/fuel mixture ratios.

Example 2

| | Percent by volume |
|---|---|
| Isopentane | 10 |
| "Isohexane" fraction | 20 |
| "Isoheptane" fraction | 70 |

This blend derived from crude oil of Iranian origin has a volatility of 30% to 70° C. and 100% to 100° C. and its octane number determined neat according to the C. F. R. Motor Method was 75. On the addition of 4 ml. tetra-ethyl lead per imperial gallon the blend showed a relative peak performance of 90% according to the standard engine test as hereinbefore described.

Example 3

| | Percent by volume |
|---|---|
| Isopentane | 10 |
| "Isohexane" fraction | 20 |
| "Isoheptane" fraction | 50 |
| Aromatic extract | 20 |

With the addition of 4 ml. tetra-ethyl lead fluid per imperial gallon this blend gave satisfactory performance in an aero-engine under all mixture conditions and showed a relative peak performance of 98%.

Example 4

| | Percent by volume |
|---|---|
| Isopentane | 10 |
| "Isohexane" fraction | 20 |
| "Isoheptane" fraction | 40 |
| Aromatic extract | 30 |

With the addition of 4 ml. tetra-ethyl lead fluid per imperial gallon this blend also had a relative peak performance of 103%.

Example 5

The following example is a blend of 100 octane number aviation fuel by blending an alkylate being the product of the alkylation of isobutane with an olefine reactant in the presence of concentrated sulphuric acid.

| | Per cent by volume |
|---|---|
| Isopentane | 10 |
| "Isohexane" fraction | 20 |
| "Isoheptane" fraction | 25 |
| Alkylate (93 octane number) | 45 |

When tested with the addition of 4 ml. tetra-ethyl lead fluid per imperial gallon, this blend also had a relative peak performance of 100%.

The following Examples 6–10 illustrate the economy effected according to the present invention in expensive blending materials such as synthetic isoparaffins and aromatic extracts. In each case, the blend contains 4.8 ml. T. E. L./I. G.

Example 6

| Composition, Vol. Per Cent | | | |
|---|---|---|---|
| Alkylate | 30 | 30 | 20 |
| Houdry Cat. Cracked Gasoline | 38 | 28 | 20 |
| Isopentane | 15 | 15 | 12 |
| Paraffinic Gasoline | 17 | | |
| Naphthenic Gasoline | | 27 | |
| Isohexane Cut | | | 22 |
| Isoheptane Cut | | | 26 |
| Estd. Octane No. | 100.7 | 100.9 | 100 |
| Estd. Rel. Peak Pegasus Performance | 105 | 105.5 | 106 |

Example 7

| Composition, Vol. Per Cent | | | |
|---|---|---|---|
| Hydrocodimer | 50 | 45 | 33 |
| Fluid Cat. Cracked Gasoline | 25 | 18 | 15 |
| Isopentane | 13 | 13 | 10 |
| Paraffinic Gasoline | 12 | | |
| Naphthenic Gasoline | | 22 | |
| Isohexane Cut | | | 25 |
| Isoheptane Cut | | | 17 |
| Estd. Octane No. | 100 | 100 | 100 |
| Estd. Rel. Peak Pegasus Performance | 105.5 | 106 | 107 |

Example 8

| Composition, Vol. Per Cent | | | |
|---|---|---|---|
| Hot Acid Octane | 40 | 33 | 22 |
| Fluid Cat. Cracked Aromatic Fraction | 25 | 22 | 10 |
| Isopentane | 15 | 15 | 12 |
| Paraffinic Gasoline | 20 | | |
| Naphthenic Gasoline | | 30 | |
| Isohexane Cut | | | 30 |
| Isoheptane Cut | | | 26 |
| Estd. Octane No | 100 | 100 | 100 |
| Estd. Rel. Peak Pegasus Performance | 105 | 106 | 106 |

Example 9

| Composition, Vol. Per Cent | | | |
|---|---|---|---|
| Alkylate | 40 | 34 | 23 |
| Hydroformed Naphtha | 30 | 28 | 17 |
| Isopentane | 15 | 15 | 12 |
| Paraffinic Gasoline | 15 | | |
| Naphthenic Gasoline | | 23 | |
| Isohexane Cut | | | 30 |
| Isoheptane Cut | | | 18 |
| Estd. Octane No | 100 | 100 | 100 |
| Estd. Rel. Peak Pegasus Performance | 105.5 | 106.5 | 106.5 |

Example 10

| Composition, Vol. Per Cent | | | |
|---|---|---|---|
| Alkylate | 46 | 40 | 20 |
| Aromatic Extract | 25 | 20 | 15 |
| Isopentane | 15 | 15 | 15 |
| Paraffinic Gasoline | 14 | | |
| Naphthenic Gasoline | | 25 | |
| Isohexane Cut | | | 30 |
| Isoheptane Cut | | | 20 |
| Estd. Octane No | 100 | 100 | 100 |
| Estd. Rel Peak Pegasus Performance | 105 | 105 | 105.5 |

The invention is applicable in the use of any crude mineral oil from which a straight run distillate boiling in the aviation or motor spirit range may be produced from which low grade fractions are removed in the manner described, and from which a series of high grade fractions are derived for blending together to produce a homogeneous high grade spirit to which may be added on aromatic or naphthenic hydrocarbon or hydrocarbons boiling in the aviation or motor spirit range together with the prescribed proportion of tetra-ethyl lead fluid to yield a product having an octane number (C. F. R. Motor Method) in excess of 95.

The boiling range of the high grade and the low grade fractions may be determined according to the character or composition of the crude oil from which the fractions are derived, the range of the high grade fractions being so determined as to include the respective fractions produced according to the process of this invention, while the boiling range of the low grade fractions separated from the distillate are so determined as to include the corresponding normal paraffins.

Since the number of constituents in any one of the fractions may be large, the calculation of optimum reflux ratio may be practically inconvenient. Thus a continuous operating column may be used under varying conditions and particularly with varying reflux ratios, and the optima conditions of operation may thus be determined by actual small scale trial. Thus for example in order to determine the most suitable reflux ratio trial runs may be made at reflux ratios between for example 10:1 and 50:1 and the products analysed. The lowest reflux ratio thus determined under which a satisfactory product is secured is obviously the economic one for use in the fractionating columns of the industrial plant.

Instead of applying the process of the invention to two basic fractions produced in a flash column, the process may be applied to a single fraction or other number of selected fractions to yield isopentane, "isohexane" and "isoheptane" fractions and for the segregation therefrom of low grade material including the normal paraffin hydrocarbons. Furthermore, no limitation is imposed to the reflux ratios, pressure and temperature conditions and the number of plates in the respective columns.

The fractionation columns may be equipped in known manner for heating the feed, as for example by a pipe still; and each of the fractionating columns e, f, g, h, i, may be provided at the base with a re-boiler by which heat may be supplied and the required temperature conditions maintained. Heat exchangers may also be employed for utilisation of the sensible heat of the effluents in known manner and pumps provided on the pipe lines adapted for control, whereby the determined reflux ratios may be maintained and the determined proportions of the overhead products pass to storage. The equipment of the columns may conform to modern practice, while the actual equipment of the plant is such as is required to carry out the superfractionation in the columns under the process conditions hereinbefore described. No limitation is however involved to the fractionation of the two basic distillates.

The process of the invention may be applied to a single distillate subjected to superfractionation in series flow through the fractionating columns. Thus the stabilised and debutanised distillate may pass in series through fractionating columns such as e, f, g, h, and i Fig. 3, whereby the isopentane and normal pentane leave the column e as overhead and pass to the cloumn f, and the "isohexane" fraction and higher hydrocarbons leave the column e as bottoms and pass from the column e to a mid-position in the length of the column g, while isopentane leaves the column f as overhead and normal pentane as bottoms. Thus the "isohexane" fraction leaves the column g as overhead and normal hexane and higher hydrocarbons as bottoms, the latter passing to the column h whence normal hexane leaves as overhead and the "isoheptane" fraction including higher hydrocarbons as bottoms pass to the column i, from which the "isoheptane" fraction leaves as overhead and the residue as bottoms. Thus the overhead from the columns f, g, and i (Figure 3) are the same respective high grade fractions as from the columns f, g and i in the process described with reference to Figure 2. Or again the debutanised feed may be passed in series through five superfractionating columns j, k, l, m, and n as illustrated in Figure 4, the top and bottom temperatures in the columns being controlled as in the process described with reference to Figures 2 and 3. The first column j (Figure 4) serves for the separation of isopentane as overhead and the second column k serves for the separation of n-pentane as overhead. The conditions of operation of the remaining columns l, m, and n (Figure 4) correspond with the conditions in the columns g, h and i of Figures 2 and 3. Thus the operations are so determined in the columns j, k, l, m and n (Figure 4) that isopentane, n-pentane, the "isohexane" fraction, n-hexane and the "isoheptane"

fraction respectively leave as overhead, while n-pentane and higher hydrocarbons, isohexane and higher hydrocarbons, n-hexane and higher hydrocarbons, isoheptane and higher hydrocarbons and the residue respectively leave the same columns as bottoms. The operating conditions in the columns in carrying out the process according to the modification illustrated in Figure 4 are determined according to the composition of the feed to the respective columns in the manner hereinbefore described with reference to Figure 2.

It will however be understood that no limitation is involved to the fractionations or sequence represented in Figures 2, 3 and 4. Thus when the petroleum distillate is divided as for example in the process illustrated in Figure 2, the division may be made other than for the recovery from one stream of normal hexane and the "isoheptane" fraction respectively, and the process conditions in the other columns determined accordingly. Furthermore the high grade fractions consisting of isopentane, the "isohexane" fraction and the "isoheptane" fraction are advantageously recovered as overhead from the respective columns. It will however be understood that the actual fractionations effected in the respective columns may be determined otherwise than as indicated respectively in Figures 2, 3 and 4 to yield the high grade fractions referred to and for the separation of the respective normal hydrocarbons under control to ensure precision of fractionation in the columns.

No limitation is involved to the process conditions particularly indicated as these may be varied according to analysis and preliminary laboratory and other tests made for the purpose of determination of the most advantageous process conditions in particular cases. Furthermore the invention is not limited to the actual fractionations and sequence indicated. These may vary. The high grade fractions are advantageously recovered as overhead and the normal paraffin hydrocarbons including n-heptane may be separated in the course of the distillation for utilisation as such in the manner hereinbefore described.

This application is a continuation-in-part of our co-pending application No. 428,530, filed January 28, 1942, now abandoned.

We claim:

1. A process for the production of a blended high grade aviation or motor fuel having an engine performance number at least substantially equal to that of iso-octane blended with 1.25 c. c. T. E. L. fluid per U. S. gallon as a minimum standard of performance which comprises blending an isopentane fraction consisting of substantially pure isopentane, an "isohexane" fraction having a boiling range of 45-64° C., an "isoheptane" fraction having a boiling range of from 72° C. to about 92° C. together with a proportion of tetra ethyl lead fluid not exceeding 6 ccs. per imperial gallon, said fractions being present each in significant amount to produce a finished blend of the stated engine performance number and being derived from the distillation of a straight run petroleum distillate obtained from paraffinic crude and boiling in the aviation or motor spirit range under conditions of precision in fractionation including the use of not substantially less than 50 theoretical plates and a reflux ratio of not substantially less than 10:1, said isopentane fraction being added in such proportion not exceeding 20% by volume of the finished blend as is necessary to ensure the required volatility of the blend, said "isohexane" fraction being added in a proportion not exceeding 25% by volume of the finished blend up to the limit of vapour to liquid ratio under which vapour lock is avoided and said "isoheptane" fraction being added in such proportion as to constitute substantially the remainder of the blend.

2. A process for the production of a blended high grade aviation or motor fuel having an engine performance number at least substantially equal to that of iso-octane blended with 1.25 c. c. of T. E. L. fluid per U. S. gallon as a minimum standard of performance which comprises blending an isopentane fraction consisting of substantially pure isopentane, an "isohexane" fraction having a boiling range of 45-64° C., and an "isoheptane" fraction having a boiling range of from 72° C. to about 92° C. together with at least one aromatic hydrocarbon blending material and a proportion of tetra ethyl lead fluid not exceeding 6 ccs. per imperial gallon, said fractions constituting the major portion of the finished blend, being present each in significant amounts to produce a finished blend of the stated engine performance number and being derived from the distillation of a straight run petroleum distillate obtained from paraffinic crude and boiling in the aviation or motor spirit range under conditions of precision in fractionation including the use of not substantially less than 50 theoretical plates and a reflux ratio of not substantially less than 10:1, said isopentane fraction being added in such proportion not exceeding 20% by volume of the finished blend as is necessary to ensure the required volatility of the blend, said "isohexane" fraction being added in a proportion not exceeding 35% by volume of the finished blend up to the limit of vapour to liquid ratio under which vapor lock is avoided, and said "isoheptane" fraction being added in a proportion not exceeding 55% by volume of the finished blend to constitute with said aromatic hydrocarbon blending material substantially the remainder of finished blend.

3. A process according to claim 2 for the production of said aviation or motor fuel in which aromatic hydrocarbons and synthetically prepared isoparaffins constitute the aromatic hydrocarbon blending material and in which said "isoheptane" fraction is added in a proportion not exceeding 40% by volume of the finished blend.

4. A process according to claim 2 in which the "isohexane" fraction comprises not more than 3% n-pentane, cyclopentane, the four hexane isomers and substantially no n-hexane.

5. A process according to claim 2 in which the "isohexane" fraction comprises not more than 2% n-pentane, cyclopentane, the four hexane isomers and not more than 1% n-hexane.

6. A process according to claim 2 in which the "isohexane" fraction comprises not more than 2% n-pentane cyclopentane, the four hexane isomers and not more than 1% n-hexane and in which the "isoheptane" fraction comprises substantially all the methyl cyclopentane and no more than 0.5% of n-heptane.

DONALD ALBERT HOWES.
THOMAS TAIT.
PATRICK DOCKSEY.
STANLEY FRANCIS BIRCH.
WILLIAM ARTHUR PARTRIDGE.

(References on following page)

REFERENCES CITED

The following references are of record in the file of this patent:

UNITED STATES PATENTS

| Number | Name | Date |
|---|---|---|
| 2,204,215 | Greensfelder | June 11, 1940 |
| 2,249,461 | Diwoky | July 15, 1941 |
| 2,305,026 | Munday | Dec. 15, 1942 |
| 2,407,717 | Marschner | Sept. 17, 1946 |
| 2,409,157 | Schulze | Oct. 8, 1946 |

OTHER REFERENCES

Hubner et al., The Oil and Gas Journal, Mar. 31, 1938, pp. 103-112.

Smittenberg et al., "Octane Ratings of a Number of Pure Hydrocarbons and some of their Binary Mixtures," Journal of Institute of Petroleum, vol. 26, 1940, pp. 294-303.